United States Patent
Yamakawa et al.

(10) Patent No.: US 7,267,443 B2
(45) Date of Patent: Sep. 11, 2007

(54) LIGHT-MODULATING PROJECTOR

(75) Inventors: Hidemasa Yamakawa, Matsumoto (JP); Akitaka Yajima, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 231 days.

(21) Appl. No.: 11/067,629

(22) Filed: Feb. 28, 2005

(65) Prior Publication Data

US 2006/0152681 A1 Jul. 13, 2006

(30) Foreign Application Priority Data

Mar. 17, 2004 (JP) ............................. 2004-076586
Feb. 17, 2005 (JP) ............................. 2005-040111

(51) Int. Cl.
*G03B 21/00* (2006.01)
*G03B 21/28* (2006.01)
*G02B 5/30* (2006.01)
*G02B 27/14* (2006.01)
*G02B 27/28* (2006.01)
*H04N 9/07* (2006.01)

(52) U.S. Cl. .......................... 353/33; 353/81; 359/490; 359/634; 348/338; 348/339

(58) Field of Classification Search .................. 353/30, 353/33, 81; 359/490, 634; 348/337–339
See application file for complete search history.

(56) References Cited

U.S. PATENT DOCUMENTS

| | | | |
|---|---|---|---|
| 5,260,830 A | * | 11/1993 | Nishida et al. ............. 359/634 |
| 5,946,056 A | | 8/1999 | Ishibashi et al. |
| 6,072,635 A | | 6/2000 | Hashizume et al. |
| 6,101,041 A | * | 8/2000 | Ishibashi et al. ............ 359/634 |
| 6,172,815 B1 | | 1/2001 | Hashizume et al. |
| 6,407,868 B1 | * | 6/2002 | Ishibashi et al. ............ 359/634 |

FOREIGN PATENT DOCUMENTS

| | | |
|---|---|---|
| JP | A-6-331807 | 12/1994 |
| JP | 11-038210 | 2/1999 |
| JP | 11-038355 | 2/1999 |
| JP | 2000-206450 | 7/2000 |
| JP | 2002-006298 | 1/2002 |

\* cited by examiner

*Primary Examiner*—W. B. Perkey
*Assistant Examiner*—Magda Cruz
(74) *Attorney, Agent, or Firm*—Oliff & Berridge, PLC

(57) ABSTRACT

Exemplary embodiments of the invention provide a projector that can readily correct for chromatic aberration caused by, for example, a projecting lens without having to give a cross dichroic prism, for example, a special preliminary process. Illumination-light components modulated by corresponding liquid-crystal light valves are synthesized in a cross dichroic prism (27) to form image light. The image light enters a projecting lens (29) from which the image light is projected onto a screen, which is not shown in the drawings. In the cross dichroic prism (27) used to synthesize light components, a first prism element (P1) has a refractive index higher than that of remaining prism elements (P2, P3 and P4). This allows a width of a red projection-image component to be made larger than widths of projection-image components of remaining colors, whereby the chromatic aberration in the projecting lens can be readily corrected.

11 Claims, 11 Drawing Sheets

(a)

(b)

(a)

(b)

LIGHT-MODULATING PROJECTOR

BACKGROUND

Exemplary embodiments of the present invention relate to projectors to project color images using liquid-crystal panels or other light-modulating elements.

The related art includes an optical system included in a typical projector that has illumination-light components of multiple colors emitted towards liquid-crystal display panels where the illumination-light components are modulated. The modulated-light components of the multiple colors are then synthesized in a light-synthesizing member known as a cross dichroic prism, so that a color image can be projected.

Related art document Japanese Unexamined Patent Application Publication No. 2000-206450 includes a projection display device that can correct for chromatic aberrations between colors for proper image formation. In such a projection display device, for example, a red-light incident surface of a cross dichroic prism is made concave and a blue-light incident surface of the cross dichroic prism is made convex. Related art document Japanese Unexamined Patent Application Publication No. 2002-6298 discloses another type that can reduce or prevent displacement of color image components by integrally providing a correction lens composed of resin in one of three incident surfaces of a synthesizing prism, such as a green-light incident surface. Related art document Japanese Unexamined Patent Application Publication No. 11-38210 discloses another type in which the thickness of joining layers between rectangular prism elements included in a cross prism is varied in order to provide convex surfaces.

SUMMARY

However, in a case where the side surfaces of a cross dichroic prism are to be processed, or a correction lens is to be integrally provided, or the thickness of the joining layers is to be varied, the manufacture process and the assembly process of, for example, the cross dichroic prism generally becomes complicated and difficult. As a result, this may lead to, for example, higher costs.

Accordingly, exemplary embodiments of the present invention provide a projector that can readily correct for chromatic aberration caused by, for example, a projecting lens without having to give a cross dichroic prism, for example, a special preliminary process.

In order to address or solve the above-mentioned and/or other problems, a first projector according to exemplary embodiments of the present invention includes (a) three light-modulating elements respectively illuminated with illumination-light components of three colors, each light-modulating element independently modulating the illumination-light component of the corresponding color; (b) a light-synthesizing member including first to fourth triangular prism elements and a pair of dichroic mirrors disposed along first and second side surfaces of the first to fourth prism elements. The modulated-light components of the three colors from the three light-modulating elements respectively entering third side surfaces of the first to third prism elements. The modulated-light components of the three colors are synthesized to form image light, the image light being emitted from a third side surface of the fourth prism element. Further, (c) an optical projecting unit to project the image light synthesized via the light-synthesizing member is included. In this projector, at least one of the first to fourth prism elements has a refractive index different from that of the remaining prism elements.

In this projector, since at least one of the first to fourth prism elements of the light-synthesizing member has a refractive index different from that of the remaining prism elements, a beam width of the modulated-light component of a particular color that passes through a particular prism element having a refractive index different from that of the remaining prism elements, can be increased or reduced with respect to a horizontal cross-section which is perpendicular to the pair of dielectric multilayer films. Consequently, this allows the width of a projection-image component of the particular color to be increased or reduced to a desired dimension, whereby a chromatic-aberration effect in the horizontal direction of a projection image caused by the optical projecting lens can be readily corrected.

Furthermore, in the first projector according to an exemplary aspect of the present invention, the modulated-light component of a predetermined color entering the third side surface of the first prism element may be transmitted through the pair of dichroic mirrors, wherein the modulated-light components of the remaining colors entering the corresponding third side surfaces of the second and third prism elements may be respectively reflected by the pair of dichroic mirrors. Accordingly, corresponding optical paths of the modulated-light components of the remaining colors are bent, and wherein the second to fourth prism elements may have the same refractive index. In this case, a beam width of the modulated-light component of the predetermined color that travels straight through a cross dichroic prism can be solely increased or reduced, while basically maintaining the beam widths of the remaining colors constant. Accordingly, this may be highly effective in a case where it is desired to correct the chromatic-aberration effect for only one particular color.

Furthermore, according to another exemplary aspect of the present invention, the predetermined color may be a color corresponding to a chromatic aberration that remains in the optical projecting unit by the greatest degree. This allows a special correction for a color that is least corrected for aberration in the optical projecting unit, thereby reducing the effect of chromatic aberration.

Furthermore, in the first projector according to another exemplary aspect of the present invention, the predetermined color may correspond to a red light component, and one of the first to third prism elements that receives the modulated-light component of a red color may have a refractive index higher than that of the other prism elements that receive the modulated-light components of the remaining colors. In this case, a chromatic aberration, which may be due to a relatively lower refractive index of the red light component with respect to a green light component and a blue light component in, for example, the prism elements, subsequent optical units, and the optical projecting unit, can be corrected.

Furthermore, in the first projector according to another exemplary aspect of the present invention, the first prism element may be disposed between the second and third prism elements and may be opposed to the fourth prism element. The second and third prism elements may have the same refractive index, and wherein the difference in refractive index between the first prism element and the second and third prism elements and the difference in refractive index between the fourth prism element and the second and third prism elements may be substantially the same in magnitude but opposite in sign to each other. In this case, with respect to a horizontal cross-section which is perpendicular to the pair of dielectric multilayer films, the beam width of the modulated-light component of the predetermined color that passes through the first prism element can be made larger or smaller than the beam widths of the remaining colors, whereby the chromatic aberration can be corrected.

Furthermore, in the first projector according to another exemplary aspect of the present invention, the first prism element may be disposed between the second and third prism elements and may be opposed to the fourth prism element. The first and second prism elements may have the same refractive index and have the same difference in refractive index with respect to the third and fourth prism elements, and wherein the third and fourth prism elements may have the same refractive index. In this case, with respect to a horizontal cross-section which is perpendicular to the pair of dielectric multilayer films, the beam widths of the modulated-light components of two predetermined colors that respectively enter the first and second prism elements can be increased or reduced, while maintaining the beam width of the modulated-light component of one remaining color constant. Accordingly, this may be highly effective in a case where it is desired to correct the chromatic-aberration effect for only two particular colors.

Furthermore, in the first projector according to another exemplary aspect of the present invention, the first prism element may be disposed between the second and third prism elements and may be opposed to the fourth prism element. The first and fourth prism elements may have the same refractive index and have the same difference in refractive index with respect to the second and third prism elements, and wherein the second and third prism elements may have the same refractive index. In this case, with respect to a horizontal cross-section which is perpendicular to the pair of dielectric multilayer films, the beam widths of the modulated-light components of two predetermined colors that respectively enter the second and third prism elements can be increased or reduced, while reducing or increasing the beam width of the modulated-light component of the one remaining color that enters the first prism element, whereby the chromatic aberration can be corrected.

A second projector according to exemplary embodiments of the present invention includes (a) three light-modulating elements respectively illuminated with illumination-light components of three colors, each light-modulating element independently modulating the illumination-light component of the corresponding color; (b) a light-synthesizing member including first to fourth triangular prism elements and a pair of dichroic mirrors disposed along first and second side surfaces of the first to fourth prism elements. The modulated-light components of the three colors from the three light-modulating elements respectively enter third side surfaces of the first to third prism elements, and wherein the modulated-light components of the three colors are synthesized to form image light, the image light being emitted from a third side surface of the fourth prism element. Further, (c) an optical projecting unit to project the image light synthesized via the light-synthesizing member is included. In this projector, at least one of the first to fourth prism elements includes a first triangular-prism subelement and a second triangular-prism subelement having different refractive indexes.

In this projector, since at least one of the first to fourth prism elements includes the first triangular-prism subelement and the second triangular-prism subelement having different refractive indexes, at least one of the sides of the optical path of the modulated-light component of a particular color that passes through the prism element having the triangular-prism subelements with different refractive indexes can be changed by refraction. Consequently, with respect to a horizontal cross-section which is perpendicular to the pair of dielectric multilayer films, the beam width of the particular color can be increased or reduced to a desired dimension, whereby the chromatic aberration among image-light components of the multiple colors can be readily corrected.

Furthermore, in the second projector according to an exemplary aspect of the present invention, one of the first to fourth prism elements may include the first triangular-prism subelement and the second triangular-prism subelement having the different refractive indexes. The refractive index of the second triangular-prism subelement in the one of the first to fourth prism elements may be the same as that of the remaining prism elements. Furthermore, in the second projector according to another exemplary aspect of the present invention, two or three of the first to fourth prism elements may each include the first triangular-prism subelement and the second triangular-prism subelement having the different refractive indexes. The first triangular-prism subelements in the two or three of the first to fourth prism elements may have the same refractive index and be disposed at positions not adjacent to each other, and wherein the refractive index of the second triangular-prism subelements in the two or three prism elements may be the same as that of the remaining prism element(s). Furthermore, in the second projector according to another exemplary aspect of the present invention, the first to fourth prism elements may each include the first triangular-prism subelement and the second triangular-prism subelement having the different refractive indexes, wherein the first triangular-prism subelements in the first to fourth prism elements may have the same refractive index and be disposed at positions not adjacent to each other. Further, the second triangular-prism subelements in the first to fourth prism elements may have the same refractive index and be disposed at positions not adjacent to each other. In the above cases, the beam width(s) of a particular color or particular colors that pass(es) through the first triangular-prism subelement(s) can be adjusted.

DETAILED DESCRIPTION OF EMBODIMENTS

First Exemplary Embodiment

Figure 1:
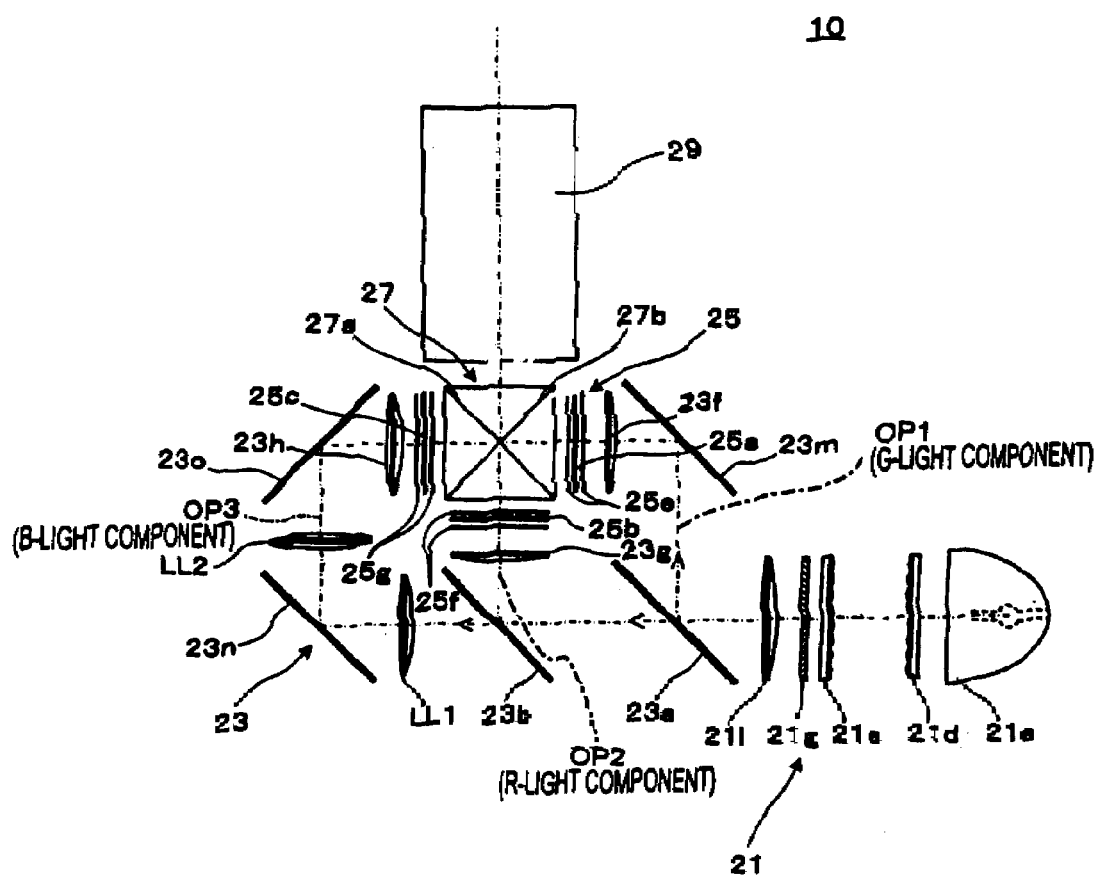
FIG. 1 is a schematic showing an optical system of a projector according to a first exemplary embodiment.

FIG. 1 illustrates an optical system of a projector according to a first exemplary embodiment. A projector 10 includes a light-source device 21 for generating light-source light; a color-separating optical unit 23 for separating the light-source light received from the light-source device 21 into three colors, namely, red, green, and blue (RGB); a light modulator 25 illuminated with illumination-light components of the three colors emitted from the color-separating optical unit 23; a cross dichroic prism 27 defining a light-synthesizing member for synthesizing modulated-light components of the three colors received from the light modulator 25; and a projecting lens 29 defining an optical projecting unit for projecting image light received from the cross dichroic prism 27 towards a screen (not shown).

The light-source device 21 includes a light-source lamp 21a; a pair of fly's-eye optical units 21d, 21e; a polarization-converting member 21g; and a superimposing lens 21i. Here, the light-source lamp 21a is, for example, a high-pressure mercury-vapor lamp and is provided with a concave mirror for collimating the light-source light. The pair of fly's-eye optical units 21d, 21e is formed of a plurality of lens elements arranged in a matrix. With these lens elements, the pair of fly's-eye optical units 21d, 21e separates the light-source light received from the light-source lamp 21a, and individually focuses/diffuses the light-source light. The polarization-converting member 21g converts the light-source light emitted from the fly's-eye optical unit 21e solely into, for example, an S-polarized component, which is perpendicular to the drawing in FIG. 1, and sends the S-polarized component to a subsequent optical unit. The superimposing lens 21i converges the illumination light received from the polarization-converting member 21g into beams so as to allow superimposed illumination against corresponding light-modulating elements provided in the light modulator 25 for the three corresponding colors. In other words, the illumination light from the two fly's-eye optical units 21d and 21e and the superimposing lens 21i travels through the color-separating optical unit 23, which will be described below in detail, so as to uniformly illuminate the light-modulating elements provided in the light modulator 25 for the corresponding colors, namely, liquid-crystal light valves 25a to 25c provided for the corresponding colors, in a superimposing manner.

The color-separating optical unit 23 includes first and second dichroic mirrors 23a, 23b; three field lenses 23f, 23g, 23h; and reflective mirrors 23m, 23n, 23o. The color-separating optical unit 23 and the light-source device 21 together define an illumination subsystem. Of the three colors, red, green, and blue, the first dichroic mirror 23a reflects a green light component and transmits a red light component and a blue light component. On the other hand, of the two incident colors, red and blue, the second dichroic mirror 23b reflects the red light component and transmits the blue light component. In the color-separating optical unit 23, the substantially white illumination light from the light-source device 21 enters the first dichroic mirror 23a. The green light component reflected by the first dichroic mirror 23a is guided along a first optical path OP1 directly in, for example, an S-polarized state, and travels via the reflective mirror 23m to enter the field lens 23f provided for incident-angle adjustment. On the other hand, the red light component transmitted through the first dichroic mirror 23a and reflected by the second dichroic mirror 23b is guided along a second optical path OP2 directly in, for example, an S-polarized state, and enters the field lens 23g. Furthermore, the blue light component transmitted through the second dichroic mirror 23b is guided towards a third optical path OP3 directly in, for example, an S-polarized state, and travels via lenses LL1, LL2 and the reflective mirrors 23n, 23o to enter the field lens 23h provided for incident-angle adjustment. In this relay optical subsystem including the lenses LL1, LL2, an image in the lens LL1 is transmitted to the field lens 23h disposed downstream so as to reduce or prevent inefficient use of light due to, for example, light diffusion.

The light modulator 25 includes the three light-modulating elements, namely, the liquid-crystal light valves 25a to 25c; and three pairs of polarizing filters 25e to 25g, each pair sandwiching a corresponding one of the liquid-crystal light valves 25a to 25c. The green light component guided along the first optical path OP1 enters the liquid-crystal light valve 25a via the field lens 23f. The red light component guided along the second optical path OP2 enters the liquid-crystal light valve 25b via the field lens 23g. The blue light component guided along the third optical path OP3 enters the liquid-crystal light valve 25c via the field lens 23h. Each of the liquid-crystal light valves 25a to 25c is a non-luminous-type light-modulating element that modulates the spatial intensity distribution of the corresponding incident illumination-light component. The three-color light components incident on the respective liquid-crystal light valves 25a to 25c are adjusted for their polarization states in pixel units based on driving signals or image signals input to the liquid-crystal light valves 25a to 25c as electric signals. In that case, the polarizing filters 25e to 25g adjust the direction of polarization of the illumination-light components incident on the corresponding liquid-crystal light valves 25a to 25c, and moreover, take out the modulated-light components of a predetermined direction of polarization from the light emitted from the liquid-crystal light valves 25a to 25c.

The cross dichroic prism 27 defines the light-synthesizing member and contains a dielectric multilayer film 27a for green-light reflection and a dielectric multilayer film 27b for blue-light reflection disposed in an orthogonal manner. In the cross dichroic prism 27, the green light component from the liquid-crystal light valve 25a is reflected by the dielectric multilayer film 27a so as to be directed to the right of the traveling direction; the red light component from the liquid-crystal light valve 25b travels straight through the dielectric multilayer films 27a, 27b so as to be emitted from the cross dichroic prism 27; and the blue light component from the liquid-crystal light valve 25c is reflected by the dielectric multilayer film 27b so as to be directed to the left of the traveling direction. Thus, the image light synthesized by the cross dichroic prism 27 travels through the projecting lens 29 so as to be projected onto a screen (not shown) at a suitable magnification.

Figure 2:
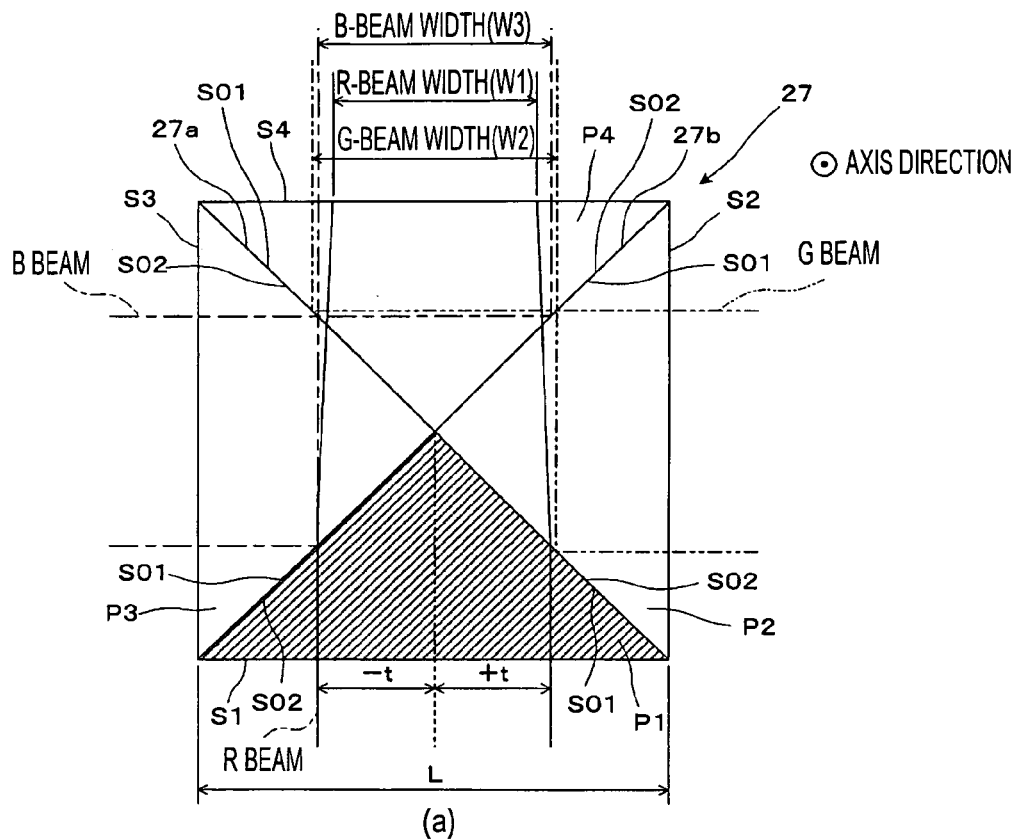
FIGS. 2(a) and (b) are a schematic plan view (a) and a side view (b) illustrating a cross dichroic prism.
Figure 2:
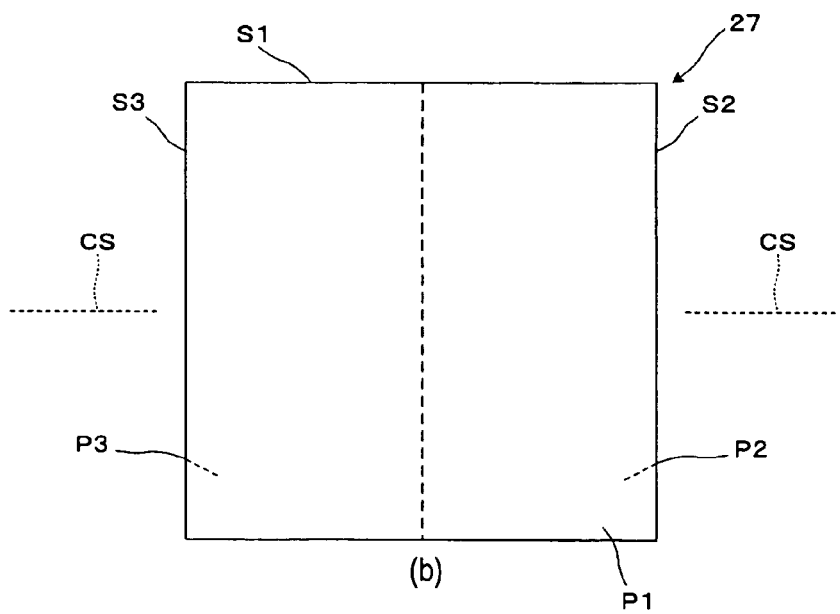

FIG. 2(a) is a schematic showing the cross dichroic prism 27 shown in FIG. 1. FIG. 2(b) is a schematic showing the cross dichroic prism 27. As is apparent from these drawings, the cross dichroic prism 27 includes prism elements, and contains the pair of dielectric multilayer films 27a, 27b extending parallel to an axis direction, which is perpendicular to the drawing of FIG. 2(a), and being disposed orthogonal to each other. Each of the dielectric multilayer films 27a, 27b functions as a dichroic mirror and can synthesize the modulated-light components of the three colors, red, green, and blue, without much loss. As is apparent from the above description, the cross dichroic prism 27 includes four prism elements P1, P2, P3, P4 which are joined to one another in a manner such that the dielectric multilayer films 27a, 27b intervene first and second side surfaces S01, S02. The first prism element P1 has a third side surface S1 which receives the red modulated-light component. The second prism element P2 has a third side surface S2 which receives the green modulated-light component. The third prism element P3 has a third side surface S3 which receives the blue modulated-light component. The remaining fourth prism element P4 has a third side surface S4 to emit the image light corresponding to the synthesized modulated-light components of the three colors. Here, the first prism element P1 has a slightly higher refractive index than the remaining second to fourth prism elements P2 to P4. On the other hand, the second to fourth prism elements P2 to P4 have the same refractive index.

A change in the width of a light beam according to the cross dichroic prism 27 will now be discussed. First, the length of each side of the cross dichroic prism 27 will be defined as L. The modulated-light component of each color to be incident on one of the prism elements P1, P2, P3 extends horizontally over a range of −t to +t in opposite directions from the corresponding optical axis, such that the range extends over a width of 2t. Furthermore, the refractive index of the first prism element P1 is defined as n1, and the refractive index of the second to fourth prism elements P2, P3, P4 is defined as n2. Furthermore, the central point of the cross dichroic prism 27 where the orthogonal apexes of all prism elements P1, P2, P3, P4 meet, is defined as a point of origin.

Firstly, regarding the red modulated-light component, a portion of the modulated-light component entering a position +t travels straight through the first prism element P1 and is refracted when it enters the second prism element P2. In this case, a shifted distance Δwa of this portion of the modulated-light component with respect to the point of origin, i.e. the optical axis, can be determined by the following formula:

[Formula 1]

$$\Delta wa = \left| \left( \frac{L}{2} + t \right) \cdot \tan\left( \arcsin\left[ \frac{n_1}{n_2} \cdot \sin 45° \right] - 45° \right) \right| \quad (1)$$

On the other hand, a portion of the modulated-light component entering a position −t travels straight through the first prism element P1 and is similarly refracted when it enters the second prism element P2. Thus, the shifted distance of this portion of the modulated-light component with respect to the point of origin, i.e. the optical axis, can be determined using Formula (1). Accordingly, an amount of change ΔWA in a beam width W1 of the red modulated-light component is represented by the following formula:

[Formula 2]

$$\Delta WA = |2\Delta wa| = \left| (L + 2t) \cdot \tan\left( \arcsin\left[ \frac{n_1}{n_2} \cdot \sin 45° \right] - 45° \right) \right| \quad (2)$$

In other words, the beam width W1 of the red modulated-light component is reduced by ΔWA.

On the other hand, since light beams of the green and blue modulated-light components respectively incident on the second and third prism elements P2, P3 do not pass through the first prism element P1, there are no changes in beam widths W2, W3 of these light beams.

In other words, according to the first exemplary embodiment, with respect to a horizontal cross-section CS which is perpendicular to the pair of dielectric multilayer films 27a, 27b, the beam width W1 of the red light component can be reduced while maintaining the beam widths W2, W3 of the respective green and blue light components constant.

Figure 3:
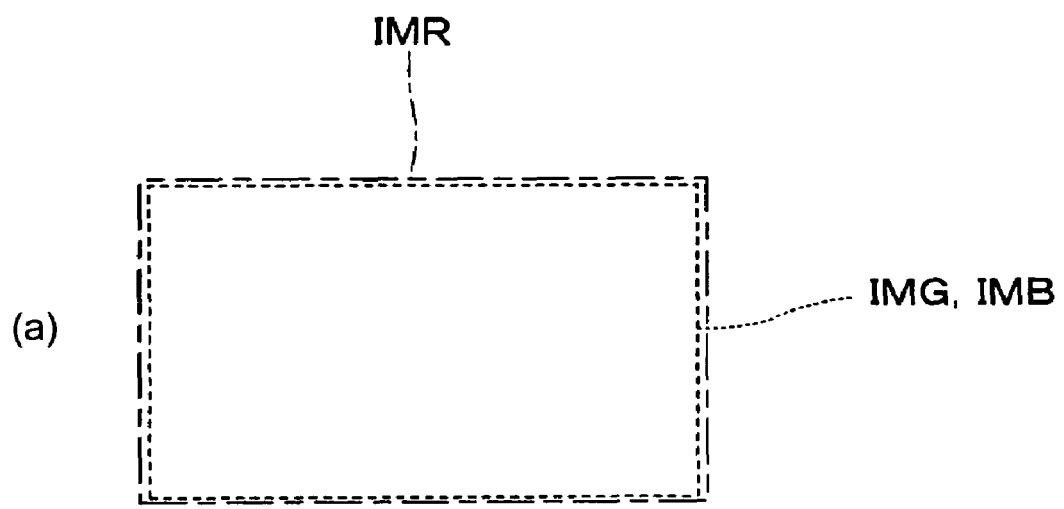
FIGS. 3(a) and (b) are schematic views showing a correction for chromatic aberration using the prism.
Figure 3:
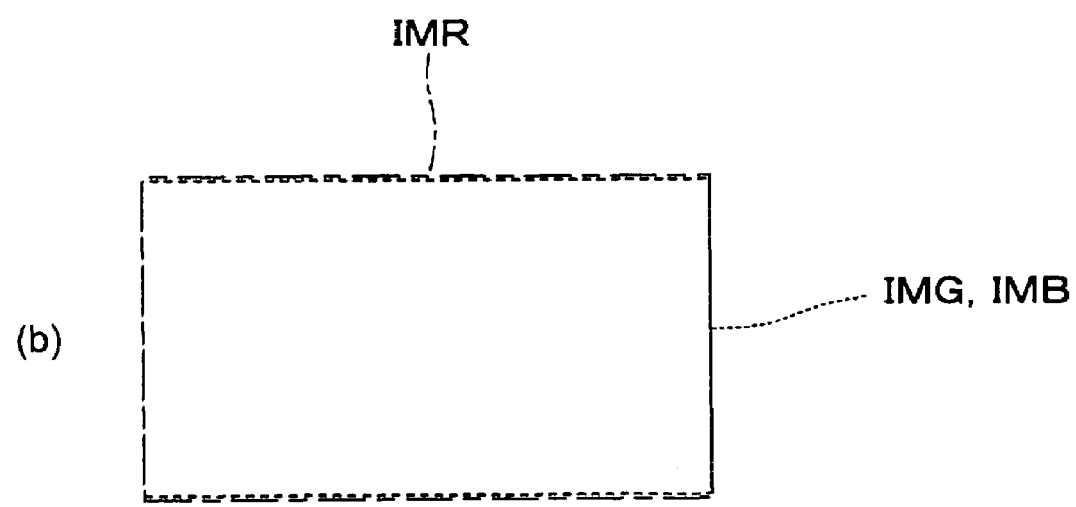

FIGS. 3(a) and (b) are schematics showing a correction for chromatic aberration in a projection image. FIG. 3(a) is a comparative example in which the prism elements P1 to P4 included in the cross dichroic prism 27 shown in, for example, FIG. 1 all have the same refractive index. In this comparative example, in comparison with green and blue projection-image components IMG, IMB, a red projection-image component IMR blurs outward and is thus magnified due to a chromatic aberration in the projecting lens 29. Furthermore, with respect to the size of the projection image, the vertical-versus-horizontal ratio is generally 3:4 or 9:16, and for this reason, the chromatic-aberration effect in the horizontal direction is highly visible, whereas the chromatic-aberration effect in the vertical direction is hardly noticeable.

On the other hand, as described above, FIG. 3(b) illustrates a case in which, of the four prism elements P1 to P4 included in the cross dichroic prism 27, the first prism element P1 is given a slightly higher refractive index. In this case, with respect to the horizontal cross-section CS perpendicular to the pair of dielectric multilayer films 27a, 27b, the beam width W1 of the red light component can be reduced while maintaining the beam widths W2, W3 of the respective green and blue light components constant. This allows the chromatic aberration in the projecting lens 29 to be corrected (made narrower) in the horizontal direction so that the width of the red projection-image component IMR becomes substantially equal to the widths of the green and blue projection-image components IMG, IMB. Although this does not solve the problem of the chromatic-aberration effect in the vertical direction, such a problem is not a significant factor since the chromatic-aberration effect in the vertical direction is hardly noticeable as mentioned above.

As described above, in the cross dichroic prism 27 used to synthesize light components according to the first exemplary embodiment, the refractive index of the first prism element P1 that receives the red light component is higher than the refractive index of the remaining second to fourth prism elements P2, P3, P4. This allows the width of the red projection-image component IMR to be made smaller than those of the green and blue projection-image components IMG, IMB, so that the chromatic-aberration effect in the horizontal direction of the projection image due to the projecting lens 29 can be readily corrected. The difference in refractive index between the first prism element P1 and the remaining prism elements P2 to P4 is actually significantly small and is set to an extent such that a vertical line of pixels at the center of the red projection-image component is not invisible.

Although the refractive index of the first prism element P1 is higher than that of the second to fourth prism elements P2, P3, P4 in the above description, the refractive index of the first prism element P1 may alternatively be lower than that of the second to fourth prism elements P2, P3, P4. In this case, with respect to the horizontal cross-section CS perpendicular to the pair of dielectric multilayer films 27a, 27b, the beam width W1 of the red light component can be increased while maintaining the beam widths W2, W3 of the respective green and blue light components constant. This may be effective for correcting the chromatic aberration in a projecting lens that projects the red projection-image component IMR smaller than the other projection-image components IMG, IMB.

Furthermore, the refractive index of the second or third prism element may alternatively be set higher or lower than those of the other prism elements. In this case, with respect to the horizontal cross-section CS perpendicular to the pair of dielectric multilayer films 27a, 27b, the beam width of the green or blue light component can be maintained constant while increasing or reducing the beam widths of the light components of the remaining colors. This allows the chromatic aberration in the projecting lens to be corrected in a desirable manner.

Second Exemplary Embodiment

A projector according to a second exemplary embodiment will now be described. This projector is an exemplary modification of the projector according to the first exemplary embodiment. The same components are indicated by the same reference numerals, and descriptions of those components will thus be omitted. Moreover, components that are not given a specific description are given a similar structure.

Figure 4:
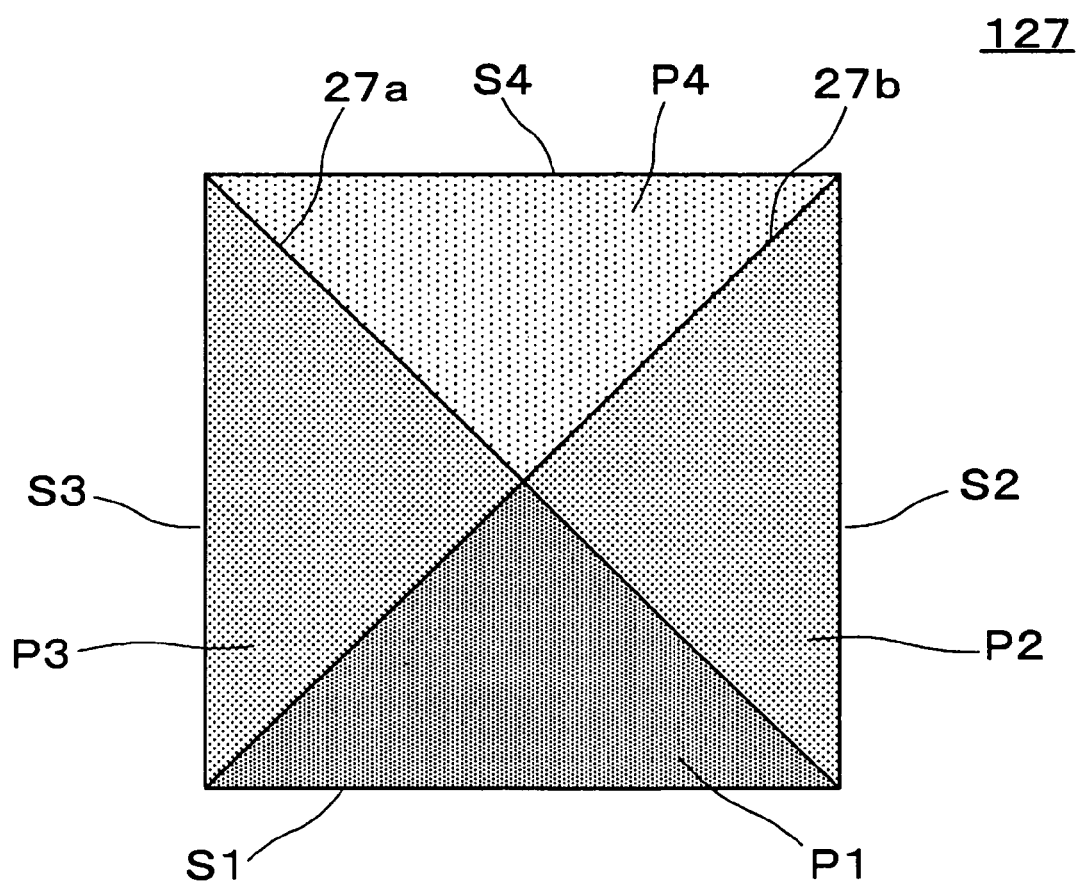
FIG. 4 is a schematic showing of a cross prism installed in a projector according to a second exemplary embodiment.

FIG. 4 is a schematic showing a cross dichroic prism installed in the projector according to the second exemplary embodiment. A cross dichroic prism 127 includes first to fourth prism elements P1 to P4, and the first prism element P1 is the same as that used in the first exemplary embodiment. The refractive index of the fourth prism element P4 is set slightly lower than that of, for example, the second and third prism elements P2 and P3. The difference in refractive index between the first prism element P1 and the second and third prism elements P2 and P3 is equal to the difference in refractive index between the fourth prism element P4 and the second and third prism elements P2 and P3.

Figure 5:
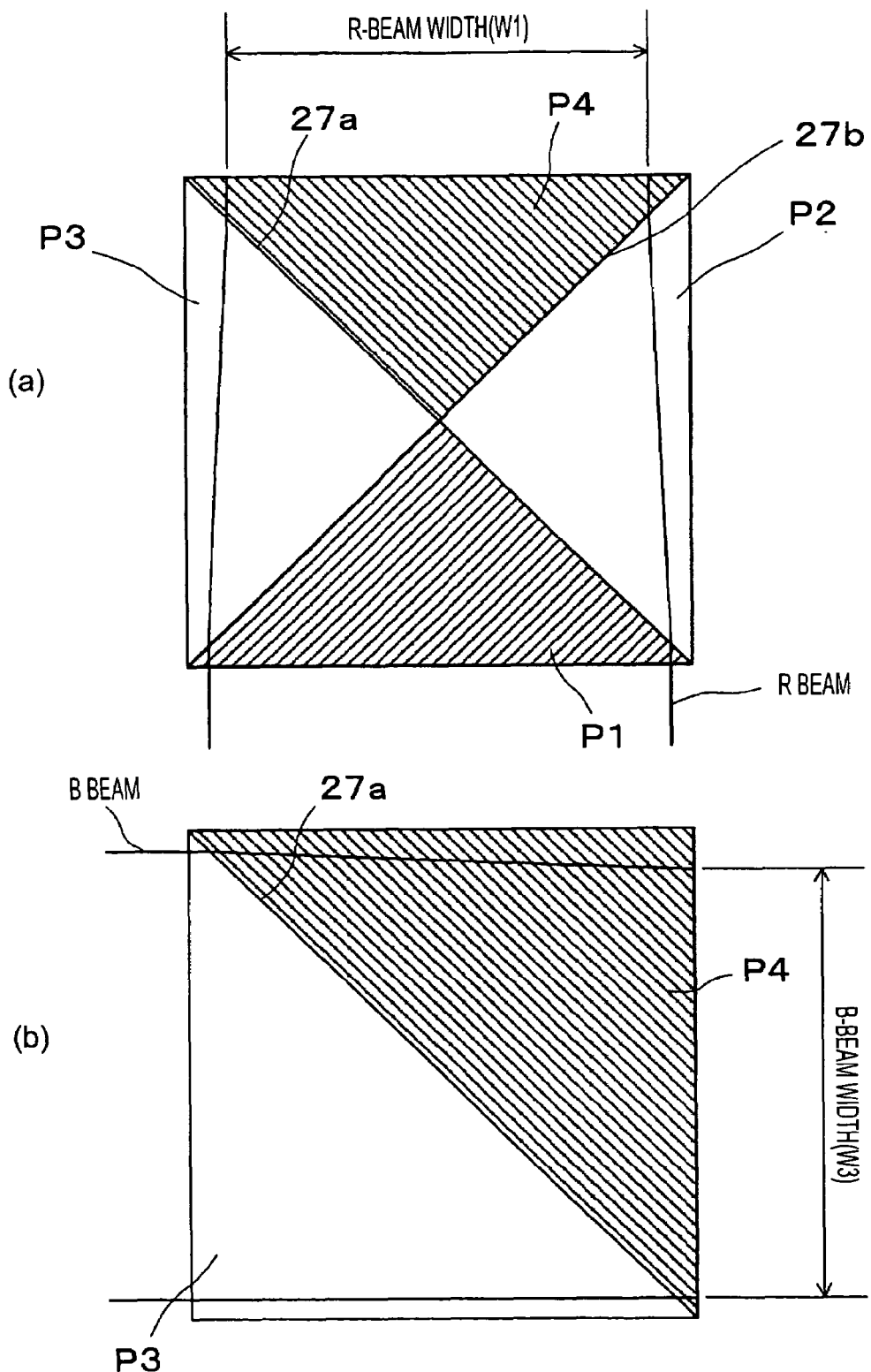
FIGS. 5(a) and (b) are schematic views showing a correction for chromatic aberration using the prism.

FIGS. 5(a)-(b) are schematics showing a change in the width of a light beam of each color according to the cross dichroic prism 127 shown in FIG. 4. Specifically, FIG. 5(a) is a schematic showing a change in the beam width W1 of the red light component. FIG. 5(b) is a schematic showing a change in the beam width W2 of the blue light component. For the sake of convenience, the dielectric multilayer film 27b that bends the optical path is omitted in FIG. 5(b), and the actual emitting direction of the light beam of the blue light component is in the upward direction of the drawing instead of the right direction of the drawing.

As shown in FIG. 5(a), the red modulated-light component is refracted when it enters the second and third prism elements P2 and P3 from the first prism element P1, and moreover, is refracted when it enters the fourth prism element P4 from the second and third prism elements P2 and P3. Consequently, with respect to the horizontal cross-section CS perpendicular to the pair of dielectric multilayer films 27a, 27b, the beam width W1 of the red light component is reduced from two sides thereof.

On the other hand, as shown in FIG. 5(b), the blue light component is refracted when it enters the fourth prism element P4 from the third prism element P3. Consequently, with respect to the horizontal cross-section CS perpendicular to the pair of dielectric multilayer films 27a, 27b, the beam width W3 of the blue light component is reduced such that the blue light component extends slantwise at one side thereof. On the other hand, the green modulated-light component corresponds to a state in which the third prism element P3 in FIG. 5(b) is replaced with the second prism element P2. Consequently, with respect to the horizontal cross-section CS perpendicular to the pair of dielectric multilayer films 27a, 27b, the beam width is reduced such that green modulated-light component extends slantwise at one side thereof, like the blue modulated-light component. Although specific calculations for determining the amount of change in each beam width will be omitted here, the amount of change in the beam width of the red modulated-light component is greater than those of the blue and green modulated-light components. In the second exemplary embodiment, even though the green and blue modulated-light components may deviate in the horizontal direction with respect to the red modulated-light component by passing through the cross dichroic prism 127, a relative displacement among the red, green, and blue image components can be corrected by moving the corresponding liquid-crystal light valves 25a to 25c in a direction perpendicular to the corresponding optical axes.

In other words, according to the second exemplary embodiment, the width of the red projection-image component can be made smaller than the widths of the green and blue projection-image components. Accordingly, this is effective for correcting the chromatic aberration in a projecting lens that projects the red projection-image component larger than the projection-image components of the remaining colors.

In the above description, although the refractive index of the first prism element P1 is slightly higher than that of the second and third prism elements P2 and P3 and the refractive index of the fourth prism element P4 is slightly lower than that of the second and third prism elements P2 and P3, the refractive index of the first prism element P1 may alternatively be slightly lower than that of the second and third prism elements P2 and P3 and the refractive index of the fourth prism element P4 may be slightly higher than that of the second and third prism elements P2 and P3. In this case, with respect to the horizontal cross-section CS perpendicular to the pair of dielectric multilayer films 27a, 27b, the beam width of the red light component can be made larger than the beam widths of the green and blue light components. Accordingly, this may be effective for correcting the chromatic aberration in a projecting lens that projects the red projection-image component smaller than the projection-image components of the remaining colors.

Third Exemplary Embodiment

A projector according to a third exemplary embodiment will now be described. This projector is an exemplary modification of the projector according to the first exemplary embodiment. The same components are indicated by the same reference numerals, and descriptions of those components will thus be omitted. Moreover, components that are not given a specific description are given a similar structure.

Figure 6:
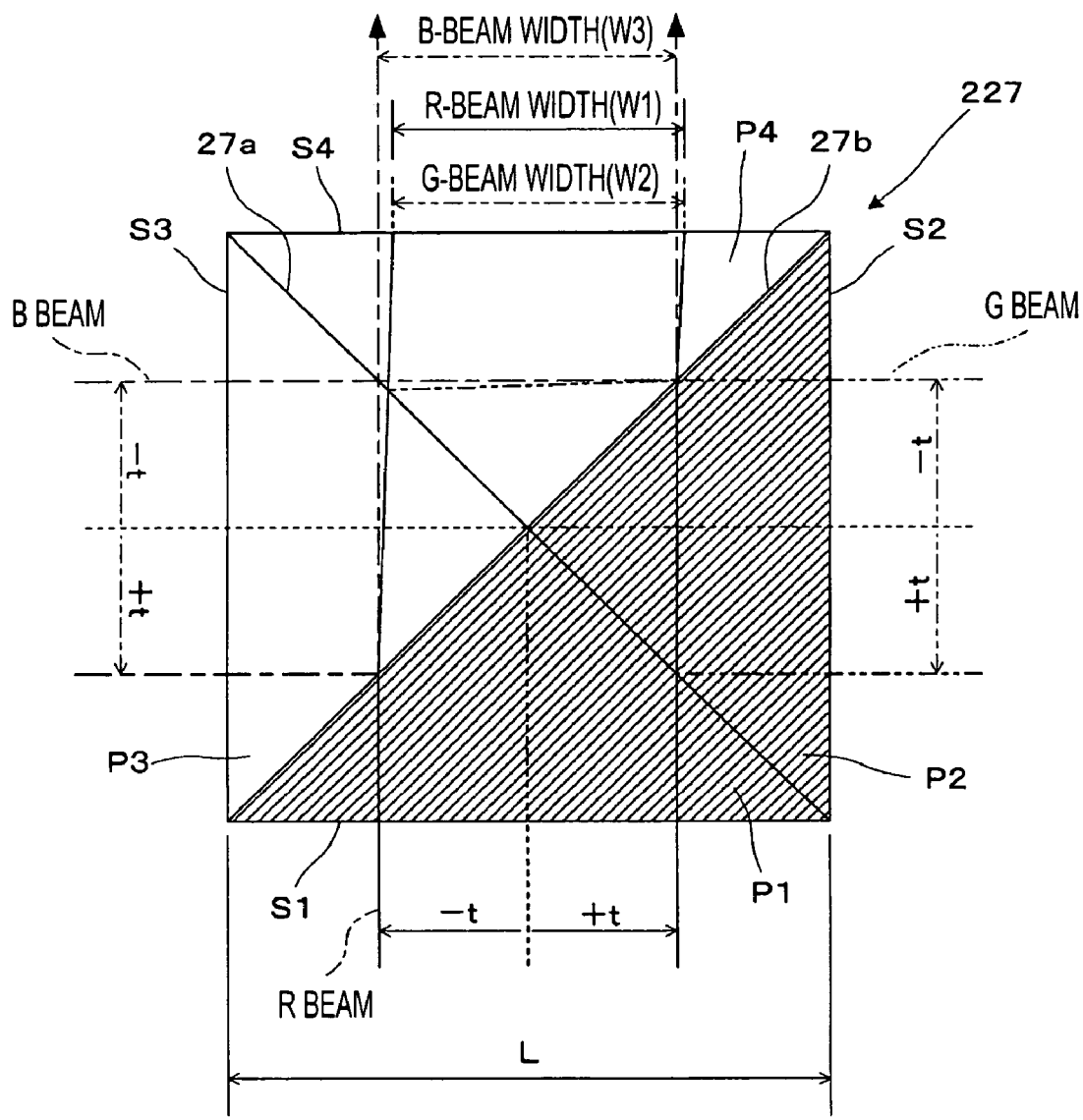
FIG. 6 is a schematic showing a cross dichroic prism according to a third exemplary embodiment.

FIG. 6 is a schematic showing a cross dichroic prism installed in the projector according to the third exemplary embodiment. A cross dichroic prism 227 includes first to fourth prism elements P1 to P4. In detail, the first and second prism elements P1, P2 have the same refractive index and the third and fourth prism elements P3, P4 have the same refractive index, such that the refractive index of the first and second prism elements P1, P2 is slightly higher than the refractive index of the third and fourth prism elements P3, P4.

A change in the width of a light beam according to the cross dichroic prism 227 shown in FIG. 6 will now be discussed. First, the length of each side of the cross dichroic prism 227 will be defined as L. The modulated-light component of each color to be incident on one of the prism elements P1, P2, P3 extends horizontally over a range of −t to +t in opposite directions from the corresponding optical axis, such that the range extends over a width of 2t. Furthermore, the refractive index of the first and second prism elements P1, P2 is defined as n1, and the refractive index of the third and fourth prism elements P3, P4 is defined as n2. Furthermore, the central point of the cross dichroic prism 227 where the orthogonal apexes of all prism elements P1, P2, P3, P4 meet is defined as a point of origin.

Firstly, regarding the red modulated-light component, a portion of the modulated-light component entering a position +t travels straight through the first and second prism elements P1, P2 and is refracted when it enters the fourth prism element P4. In this case, a shifted distance Δwb of this portion of the modulated-light component with respect to the point of origin, i.e. the optical axis, can be determined by the following formula:

[Formula 3]

$$\Delta wb = \left| \left(\frac{L}{2} - t\right) \cdot \tan\left(\arcsin\left[\frac{n_1}{n_2} \cdot \sin 45°\right] - 45°\right) \right| \quad (3)$$

On the other hand, a portion of the modulated-light component entering a position −t travels straight through the first prism element P1 and is refracted when it enters the third prism element P3. In this case, a shifted distance Δwb' of this portion of the modulated-light component with respect to the point of origin, i.e. the optical axis, can be determined by the following formula:

[Formula 4]

$$\Delta wb' = \left| \left(\frac{L}{2} + t\right) \cdot \tan\left(\arcsin\left[\frac{n_1}{n_2} \cdot \sin 45°\right] - 45°\right) \right| \quad (4)$$

Accordingly, an amount of change ΔWB in the beam width W1 of the red modulated-light component corresponds to an absolute value of the difference between Formula (3) and Formula (4), which is represented by the following formula:

[Formula 5]

$$\Delta WB = |\Delta wb' - \Delta wb| = \left| 2t \cdot \tan\left(\arcsin\left[\frac{n_1}{n_2} \cdot \sin 45°\right] - 45°\right) \right| \quad (5)$$

In other words, the beam width W1 of the red modulated-light component is reduced by ΔWB.

On the other hand, regarding the green modulated-light component, a portion of the modulated-light component entering a position +t is bent in the second prism element P2, and is subsequently refracted when it enters the fourth prism element P4. In this case, the shifted distance of this portion of the modulated-light component with respect to the point of origin, i.e. the optical axis, is determined by Formula (3). On the other hand, a portion of the modulated-light component entering a position −t passes through the second prism element P2, is refracted when it enters the fourth prism element P4, and is then bent in the fourth prism element P4. In this case, the shifted distance of this portion of the modulated-light component with respect to the point of origin, i.e. the optical axis, is determined by Formula (4). Consequently, the amount of change in the beam width W2 of the green modulated-light component is determined using Formula (5). In other words, the beam width W1 of the green modulated-light component is reduced by the same amount as the beam width W2 of the red modulated-light component.

On the other hand, regarding the blue modulated-light component, portions of the modulated-light component entering the positions ±t are not subject to changes caused by refractive indexes, and therefore, the amount of reduction of the beam width W3 of the blue modulated-light component is zero.

To summarize the above description, with respect to the horizontal cross-section CS perpendicular to the pair of dielectric multilayer films 27a, 27b, the use of the cross dichroic prism 227 shown in FIG. 6 allows the beam width W1 of the red light component and the beam width W2 of the green light component to be reduced while maintaining the beam width W3 of the blue light component constant. Furthermore, a relative displacement among the red, green, and blue image components can be corrected by moving the corresponding liquid-crystal light valves 25a to 25c in a direction perpendicular to the corresponding optical axes.

As described above, in the cross dichroic prism 227 used to synthesize light components according to the third exemplary embodiment, the refractive index of the first and second prism elements P1, P2 is higher than the refractive index of the third and fourth prism elements P3, P4. This allows the widths of the red and green projection-image components to be made smaller than the width of the blue projection-image component. Accordingly, this is effective for correcting the chromatic aberration in a projecting lens that projects the red and green projection-image components larger than the blue projection-image component.

Although the refractive index of the first and second prism elements P1, P2 is slightly higher than that of the third and fourth prism elements P3, P4 in the above description, the refractive index of the first and second prism elements P1, P2 may alternatively be slightly lower than that of the third and fourth prism elements P3, P4. In this case, with respect to the horizontal cross-section CS perpendicular to the pair of dielectric multilayer films 27a, 27b, the beam width W1 of the red light component and the beam width W2 of the green light component can be increased while maintaining the beam width W3 of the blue light component constant. This may be effective for correcting the chromatic aberration in a projecting lens that projects the red and green projection-image components smaller than the blue projection-image component.

Fourth Exemplary Embodiment

A projector according to a fourth exemplary embodiment will now be described. This projector is an exemplary modification of the projector according to the third exemplary embodiment. Moreover, components that are not given a specific description are given a similar structure.

Figure 7:
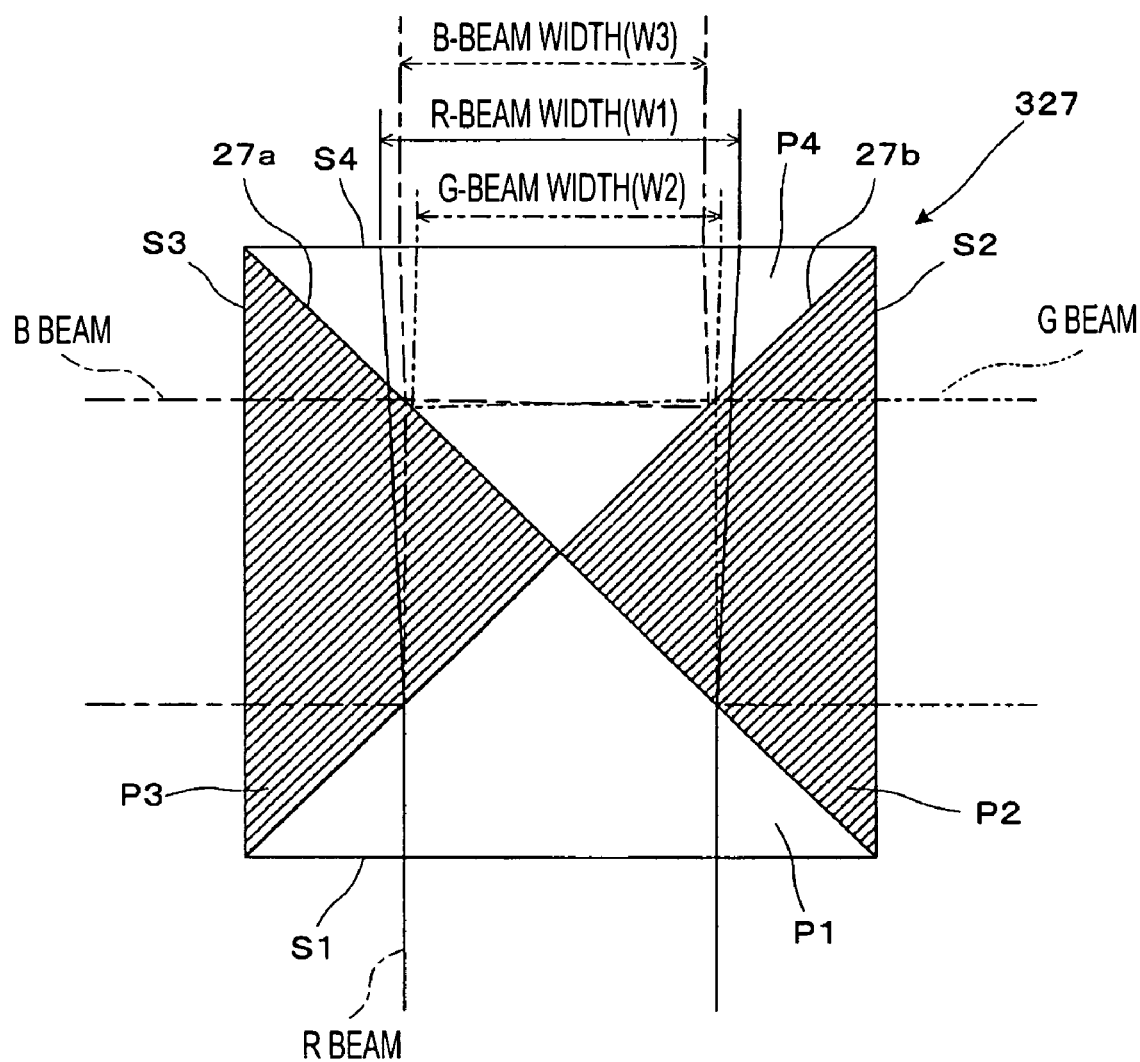
FIG. 7 is a schematic showing a cross dichroic prism according to a fourth exemplary embodiment.

FIG. 7 is a schematic showing a cross dichroic prism installed in the projector according to the fourth exemplary embodiment. A cross dichroic prism 327 includes first to fourth prism elements P1 to P4. In detail, the first and fourth prism elements P1, P4 have the same refractive index and the second and third prism elements P2, P3 have the same refractive index, such that the refractive index of the second and third prism elements P2, P3 is slightly higher than the refractive index of the first and fourth prism elements P1, P4.

The red modulated-light component is refracted when it enters the second and third prism elements P2, P3 from the first prism element P1, such that the beam width increases. The red modulated-light component is further refracted when it enters the fourth prism element P4 from the second and third prism elements P2, P3, whereby the beam width of the red modulated-light component is further increased.

On the other hand, the green modulated-light component travels along the same optical path as that shown in FIG. 6 in the third exemplary embodiment. In other words, the beam width of the green modulated-light component is reduced.

On the other hand, the blue modulated-light component travels along an optical path that is symmetrical to that of the green modulated-light component with respect to the horizontal direction of the drawing. For this reason, the blue modulated-light component is subject to the same effect as the green modulated-light component, meaning that the beam width of the blue modulated-light component is similarly reduced.

Specific calculations for determining the amount of change in the beam width of the light component of each color will be omitted.

To summarize the above description, with respect to the horizontal cross-section CS perpendicular to the pair of dielectric multilayer films 27a, 27b, the use of the cross dichroic prism 327 shown in FIG. 7 allows the beam width W1 of the red light component to be increased while reducing the beam widths W2, W3 of the green and blue light components. Specifically, according to the fourth exemplary embodiment, the width of the red projection-image component can be made larger than the widths of the green and blue projection-image components. Accordingly, this is effective for correcting the chromatic aberration in a projecting lens that projects the red projection-image component smaller than the projection-image components of the remaining colors.

Although the refractive index of the second and third prism elements P2, P3 is slightly higher than that of the first and fourth prism elements P1, P4 in the above description, the refractive index of the second and third prism elements P2, P3 may alternatively be slightly lower than that of the first and fourth prism elements P1, P4. In this case, with respect to the horizontal cross-section CS perpendicular to the pair of dielectric multilayer films 27a, 27b, the beam width W1 of the red light component can be reduced while increasing the beam widths W2, W3 of the green and blue light components. Accordingly, this may be effective for correcting the chromatic aberration in a projecting lens that projects the red projection-image component larger than the projection-image components of the remaining colors.

Fifth Exemplary Embodiment

A projector according to a fifth exemplary embodiment will now be described. This projector is an exemplary modification of the projector according to the first exemplary embodiment. Moreover, components that are not given a specific description are given a similar structure.

Figure 8:
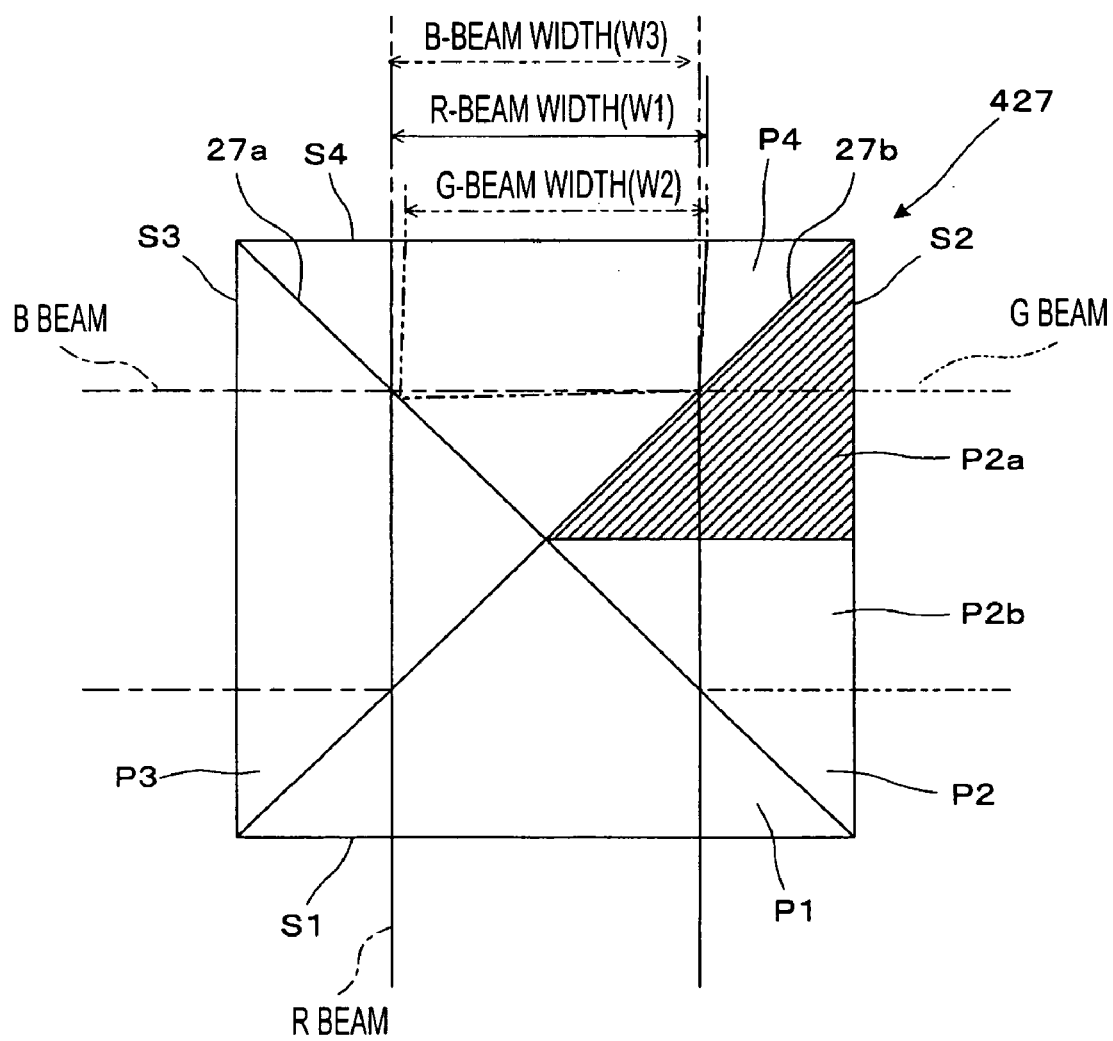
FIG. 8 is a schematic showing a cross dichroic prism according to a fifth exemplary embodiment.

FIG. 8 is a schematic showing a cross dichroic prism installed in the projector according to the fifth exemplary embodiment. A cross dichroic prism 427 includes first to fourth prism elements P1 to P4. Specifically, the second prism element P2 includes first and second triangular-prism subelements P2a, P2b having different refractive indexes. The first, third, and fourth prism elements P1, P3, P4 and the second triangular-prism subelement P2b have the same refractive index, whereas the first triangular-prism subelement P2a is given a slightly higher refractive index.

A first portion of the red modulated-light component that enters the fourth prism element P4 via the second prism element P2 is refracted when it becomes incident on the fourth prism element P4, such that the first portion is shifted by a distance determined using Formula (3) described in the third exemplary embodiment. On the other hand, a second portion of the red modulated-light component that enters the fourth prism element P4 via the third prism element P3 is not shifted since this second portion is not refracted when it becomes incident on the fourth prism element P4. In other words, the beam width W1 of the red light component is increased only by a small amount. Moreover, the amount of change in the beam width W1 is equal to $\Delta wb$ determined using Formula (3).

A first portion of the green modulated-light component that first enters the first triangular-prism subelement P2a and is then bent in the fourth prism element P4 is refracted when it becomes incident on the fourth prism element P4, such that the first portion is shifted by a distance determined using Formula (4) described in the third exemplary embodiment. On the other hand, a second portion of the green modulated-light component that first enters the second triangular-prism subelement P2b, is then bent in the second triangular-prism subelement P2b, and finally enters the fourth prism element P4 is refracted when this second portion becomes incident on the fourth prism element P4. The second portion is thus shifted by a distance determined using Formula (3) described in the third exemplary embodiment. In other words, the beam width W2 of the green light component is reduced by a small amount. Moreover, the amount of reduction is determined using Formula (5).

On the other hand, the blue modulated-light component is not subject to changes caused by refractive indexes, and therefore, the amount of reduction of the beam width W3 of the blue modulated-light component is zero.

To summarize the above description, with respect to the horizontal cross-section CS perpendicular to the pair of dielectric multilayer films 27a, 27b, the use of the cross dichroic prism 427 shown in FIG. 8 allows the beam width W1 of the red light component to be increased and the beam width W2 of the green light component to be reduced while maintaining the beam width W3 of the blue light component constant. In other words, according to the fifth exemplary embodiment, the width of the red projection-image component can be made larger than the width of the blue projection-image component, and the width of the green projection-image component can be made smaller than the width of the blue projection-image component. Accordingly, this is effective for correcting the chromatic aberration in a projecting lens that projects the red projection-image component smaller than the blue projection-image component, and the green projection-image component larger than the blue projection-image component.

Although the refractive index of the first triangular-prism subelement P2a is higher than that of the other prism components in the above description, the refractive index of the first triangular-prism subelement P2a may alternatively be lower than that of the other prism components. In this case, with respect to the horizontal cross-section CS perpendicular to the pair of dielectric multilayer films 27a, 27b, the beam width W1 of the red light component can be reduced and the beam width W2 of the green light component can be increased. Accordingly, this may be effective for correcting the chromatic aberration in a projecting lens that projects the red projection-image component larger than the blue projection-image component, and the green projection-image component smaller than the blue projection-image component.

Furthermore, instead of the first triangular-prism subelement P2a, the refraction index of the second triangular-prism subelement P2b may alternatively be set higher or lower than that of the other prism components. In this case, with respect to the horizontal cross-section CS perpendicular to the pair of dielectric multilayer films 27a, 27b, the beam width W1 of the red light component can be increased or reduced, and the beam width W2 of the green light component can be reduced or increased. Accordingly, this may be effective for correcting the chromatic aberration in a projecting lens that projects the red projection-image component smaller or larger than the blue projection-image component, and the green projection-image component larger or smaller than the blue projection-image component.

Furthermore, instead of the second prism element P2, one of the first, third, and fourth prism elements P1, P3, P4 may alternatively include the first and second triangular-prism subelements, such that one of the two triangular-prism subelements may have a refractive index higher or lower than that of the other prism components. In this case, with respect to the horizontal cross-section CS perpendicular to the pair of dielectric multilayer films 27a, 27b, the beam width of each color can be increased or reduced so that the chromatic aberration in the projecting lens can be corrected in a desirable manner.

Sixth Exemplary Embodiment

A projector according to a sixth exemplary embodiment will now be described. This projector is an exemplary modification of the projector according to the fifth exemplary embodiment. Moreover, components that are not given a specific description are given a similar structure.

Figure 9:
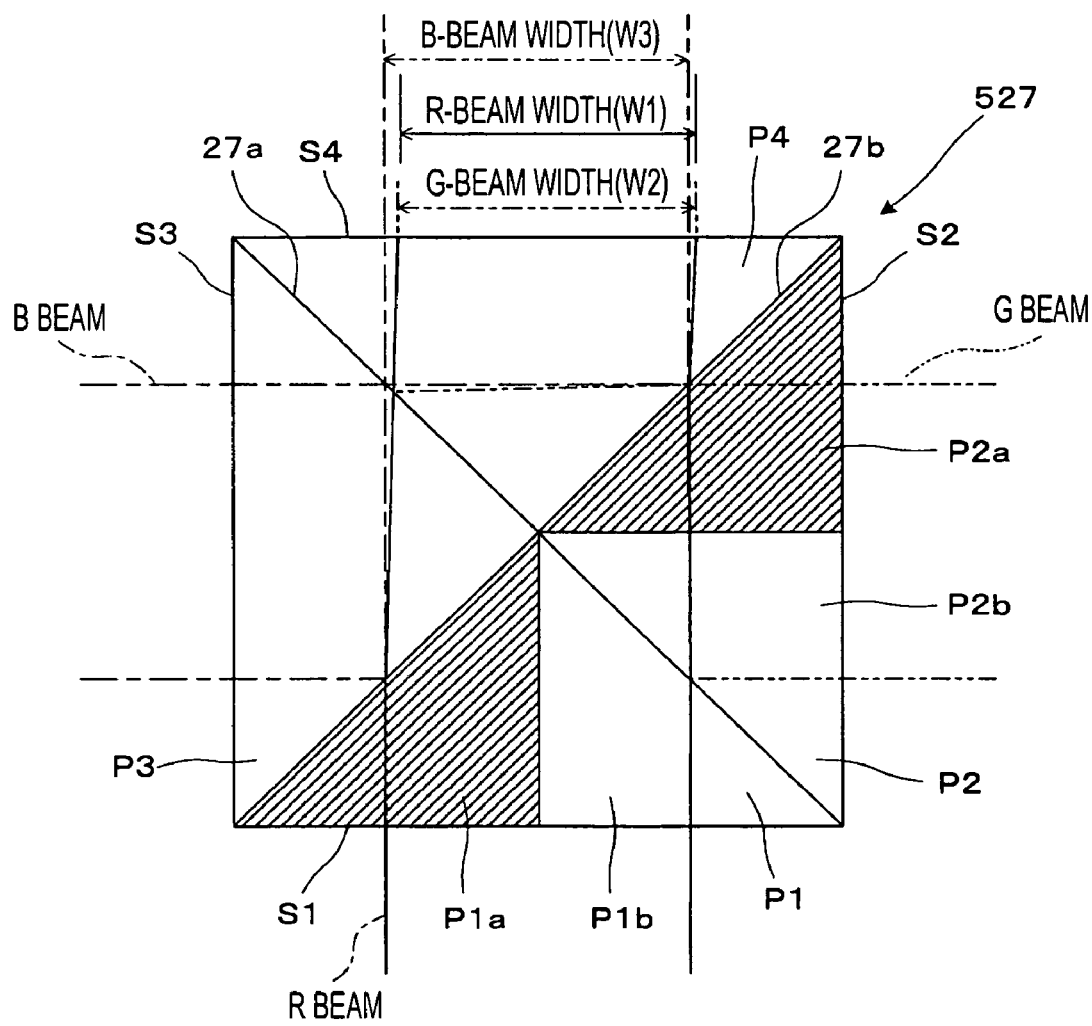
FIG. 9 is a schematic showing a cross dichroic prism according to a sixth exemplary embodiment.

FIG. 9 is a schematic showing a cross dichroic prism installed in the projector according to the sixth exemplary embodiment. A cross dichroic prism 527 includes first to fourth prism elements P1 to P4. Specifically, the first prism element P1 includes first and second triangular-prism subelements P1a, P1b having different refractive indexes, and similarly, the second prism element P2 includes the first and second triangular-prism subelements P2a, P2b having different refractive indexes. The third and fourth prism elements P3, P4 and the second triangular-prism subelements P1b, P2b have the same refractive index, whereas the first triangular-prism subelements P1a, P2a are given a slightly higher refractive index.

As is apparent from FIG. 9, the red modulated-light component travels along the same optical path as that shown in FIG. 6 in the third exemplary embodiment. In other words, the beam width W1 of the red light component is slightly reduced.

Furthermore, the green modulated-light component travels along the same optical path as that shown in FIG. 8 in the fifth exemplary embodiment. In other words, the beam width W2 of the green light component is slightly reduced.

On the other hand, the blue modulated-light component is not subject to changes caused by refractive indexes, and therefore, the amount of reduction of the beam width W3 of the blue modulated-light component is zero.

To summarize the above description, with respect to the horizontal cross-section CS perpendicular to the pair of dielectric multilayer films 27a, 27b, the use of the cross dichroic prism 527 shown in FIG. 9 allows the beam widths W1, W2 of the red and green light components to be reduced while maintaining the beam width W3 of the blue light component constant. In other words, according to the sixth exemplary embodiment, the widths of the red and green projection-image components can be made smaller than the width of the blue projection-image component. Accordingly, this is effective for correcting the chromatic aberration in a projecting lens that projects the red and green projection-image components larger than the blue projection-image component.

Although the refractive index of the first triangular-prism subelements P1a, P2a is higher than the refractive index of the other prism components in the above description, the refractive index of the first triangular-prism subelements P1a, P2a may alternatively be lower than the refractive index of the other prism components. In this case, with respect to the horizontal cross-section CS perpendicular to the pair of dielectric multilayer films 27a, 27b, the beam widths W1, W2 of the red and green light components can be increased. Accordingly, this may be effective for correcting the chromatic aberration in a projecting lens that projects the red and green projection-image components smaller than the blue projection-image component. Furthermore, instead of the first triangular-prism subelements P1a, P2a, the refractive index of the first triangular-prism subelement P1a and the second triangular-prism subelement P2b may alternatively be set higher or lower than that of the other prism components. Alternatively, the refractive index of the second triangular-prism subelement P1b and the first triangular-prism subelement P2a may alternatively be set higher or lower than the other prism components. As a further alternative, in place of the set of first and second prism elements P1, P2, the first and second triangular-prism subelements having different refractive indexes may alternatively be provided in one of the sets of the first and third prism elements; the first and fourth prism elements; the second and third prism elements; the second and fourth prism elements; and the third and fourth prism elements, such that the two first triangular-prism subelements or the two second triangular-prism subelements may have a refractive index higher or lower than that of the other prism components. In this case, with respect to the horizontal cross-section CS perpendicular to the pair of dielectric multilayer films 27a, 27b, the beam width of each color can be increased or reduced so that the chromatic aberration in the projecting lens can be corrected in a desirable manner.

In the sixth exemplary embodiment, however, the two triangular-prism subelements having a refractive index different from the other prism components must be disposed in a non-adjacent manner. This is due to the fact that if, for example, adjacently-disposed second triangular-prism subelements P1b, P2b have a refractive index set higher or lower than the other prism components, the red modulated-light component and the green modulated-light component will pass through the cross dichroic prism 527 while being hardly refracted, meaning that the correction for the chromatic aberration cannot be performed.

Seventh Exemplary Embodiment

A projector according to the seventh exemplary embodiment will now be described. This projector is an exemplary embodiment of the projector according to the sixth exemplary embodiment. Moreover, components that are not given a specific description are given a similar structure.

Figure 10:
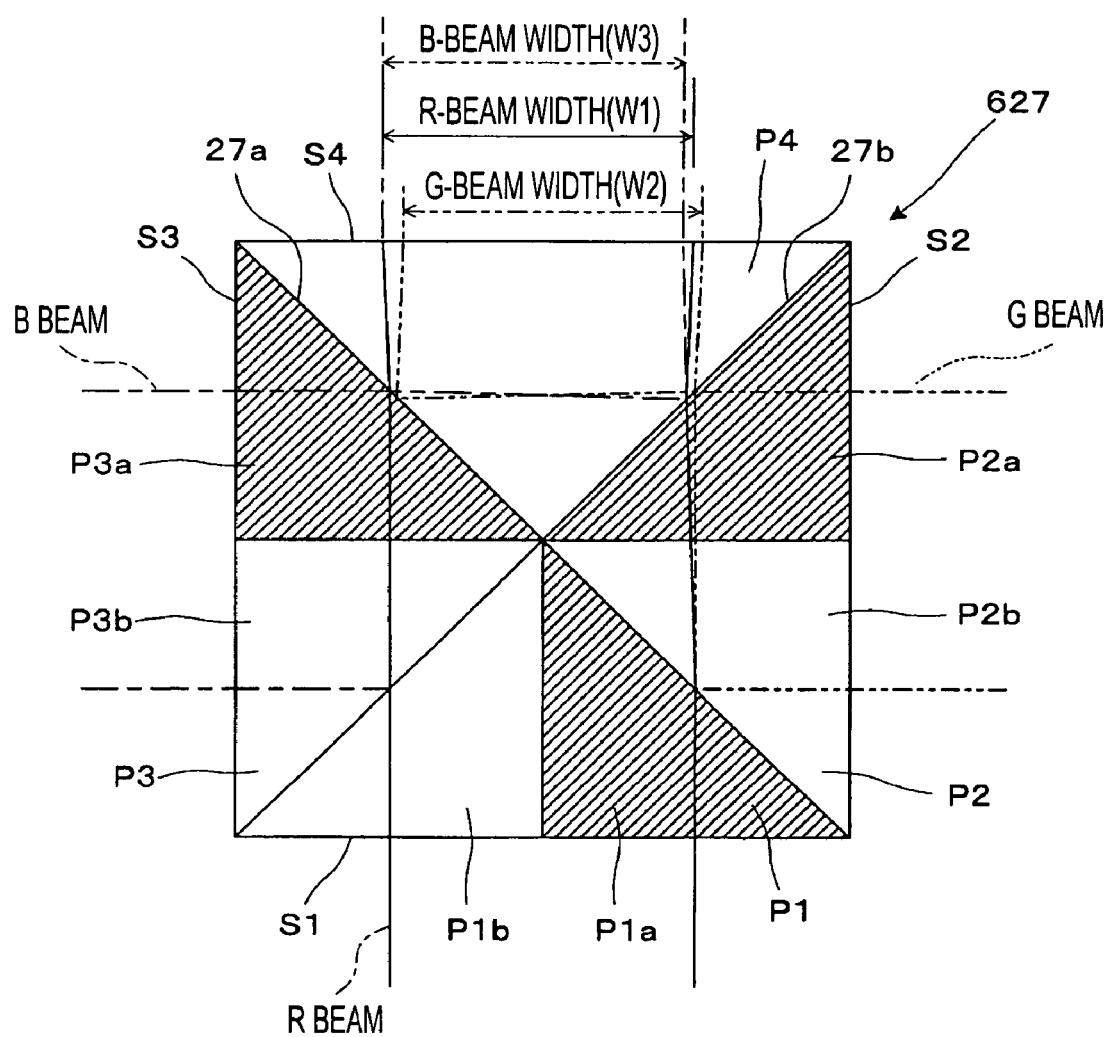
FIG. 10 is a schematic showing a cross dichroic prism according to a seventh exemplary embodiment.

FIG. 10 is a schematic showing a cross dichroic prism installed in the projector according to the seventh exemplary embodiment. A cross dichroic prism 627 includes first to fourth prism elements P1 to P4. Specifically, the first prism element P1 includes the first and second triangular-prism subelements P1a, P1b having different refractive indexes; the second prism element P2 includes the first and second triangular-prism subelements P2a, P2b having different refractive indexes; and the third prism element P3 includes first and second triangular-prism subelements P3a, P3b having different refractive indexes. The fourth prism element P4 and the second triangular-prism subelements P1b, P2b, P3b have the same refractive index, whereas the first triangular-prism subelements P1a, P2a, P3a are given a slightly higher refractive index.

A first portion of the red modulated-light component that first enters the first triangular-prism subelement P1a and then enters the fourth prism element P4 via the second prism element P2 is refracted when it becomes incident on the second triangular-prism subelement P2b of the second prism element P2 and on the first triangular-prism subelement P2a. This shifts the first portion such that its width is reduced. The first portion is refracted again when it subsequently becomes incident on the fourth prism element P4. This shifts the first portion such that its width remains the same or is increased back to its original width. On the other hand, a second portion of the red modulated-light component that first enters the second triangular-prism subelement P1b and then enters the fourth prism element P4 via the third prism element P3 is refracted when it becomes incident on the fourth prism element P4, such that the width of the second portion is slightly increased. Consequently, the beam width W1 of the red light component hardly changes.

On the other hand, the green modulated-light component travels along the same optical path as those shown in FIGS. 8 and 9 in the fifth and sixth exemplary embodiments, respectively.

A first portion of the blue modulated-light component that first enters the first triangular-prism subelement P3a travels in the same manner but in the opposite direction as the first portion of the green modulated-light component that enters the first triangular-prism subelement P2a. On the other hand, a second portion of the blue modulated-light component that first enters the second triangular-prism subelement P3b travels in the same manner but in the opposite direction as the second portion of the green modulated-light component that enters the second triangular-prism subelement P2b. In other words, the beam width W3 of the blue light component is slightly reduced.

Specific calculations for determining the amount of change in the beam width of the light component of each color will be omitted.

To summarize the above description, with respect to the horizontal cross-section CS perpendicular to the pair of dielectric multilayer films 27a, 27b, the use of the cross dichroic prism 627 shown in FIG. 10 allows the beam widths W2, W3 of the green and blue light components to be relatively reduced while maintaining the change in the beam width W1 of the red light component at a small amount. In other words, according to the seventh exemplary embodiment, the widths of the green and blue projection-image components can be made smaller than the width of the red projection-image component. Accordingly, this is effective for correcting the chromatic aberration in a projecting lens that projects the green and blue projection-image components larger than the red projection-image component.

Although the refractive index of the first triangular-prism subelements P1a, P2a, P3a is higher than that of the other prism components in the above description, the refractive index of the first triangular-prism subelements P1a, P2a, P3a may alternatively be lower than the refractive index of the other prism components. In this case, with respect to the horizontal cross-section CS perpendicular to the pair of dielectric multilayer films 27a, 27b, the beam widths W2, W3 of the green and blue light components can be relatively increased while maintaining the change in the beam width W1 of the red light component at a small amount. Accordingly, this may be effective for correcting the chromatic aberration in a projecting lens that projects the green and blue projection-image components smaller than the red projection-image component. As a further alternative, instead of the set of first triangular-prism subelements P1a, P2a, P3a, a set of triangular-prism subelements P1a, P2a, P3b may have a refractive index higher or lower than that of the other prism components; or a set of triangular-prism subelements P1b, P2a, P3b may have a refractive index higher or lower than that of the other prism components; or a set of triangular-prism subelements P1b, P2b, P3a may have a refractive index higher or lower than that of the other prism components. Furthermore, in place of the set of the first, second, and third prism elements P1, P2, P3, the first and second triangular-prism subelements having different refractive indexes may alternatively be provided in one of the sets of the first, second, and fourth prism elements; the first, third, and fourth prism elements; the second, third, and fourth prism elements, such that the three first triangular-prism subelement or the three second triangular-prism subelement may have a refractive index higher or lower than that of the other prism components. In this case, with respect to the horizontal cross-section CS perpendicular to the pair of dielectric multilayer films 27a, 27b, the beam width of each color can be increased or reduced so that the chromatic aberration in the projecting lens can be corrected in a desirable manner. In the seventh exemplary embodiment, however, two of the three triangular-prism subelements having a refractive index different from the other prism components must be disposed in a non-adjacent manner, like in the sixth exemplary embodiment.

Eighth Exemplary Embodiment

A projector according to an eighth exemplary embodiment will now be described. This projector is an exemplary modification of the projector according to the seventh exemplary embodiment. Moreover, components that are not given a specific description are given a similar structure.

Figure 11:
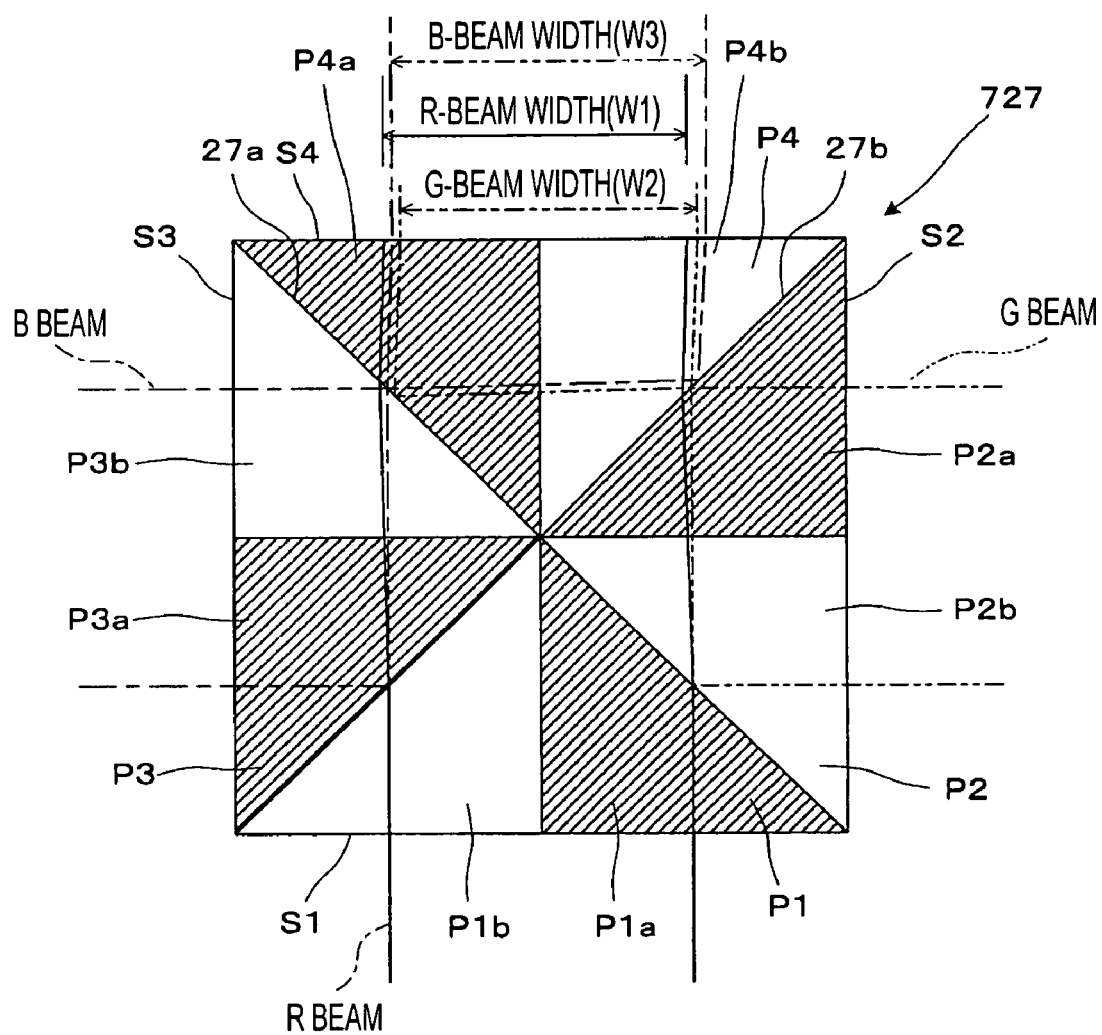
FIG. 11 is a schematic showing a cross dichroic prism according to an eighth exemplary embodiment.

FIG. 11 is a schematic showing a cross dichroic prism installed in the projector according to the eighth exemplary embodiment. A cross dichroic prism 727 includes first to fourth prism elements P1 to P4. Specifically, the first prism element P1 includes the first and second triangular-prism subelements P1a, P1b having different refractive indexes; the second prism element P2 includes the first and second triangular-prism subelements P2a, P2b having different refractive indexes; the third prism element P3 includes the first and second triangular-prism subelements P3a, P3b having different refractive indexes; and the fourth prism element P4 includes first and second triangular-prism subelements P4a, P4b having different refractive indexes. The second triangular-prism subelements P1b, P2b, P3b, P4b have the same refractive index, whereas the first triangular-prism subelements P1a, P2a, P3a, P4a are given a slightly higher refractive index.

A first portion of the red modulated-light component that first enters the first triangular-prism subelement P1a and then enters the fourth prism element P4 via the second prism element P2 is refracted when it becomes incident on the second prism element P2. This shifts the first portion such that its width is reduced. The first portion is refracted again when it subsequently becomes incident on the fourth prism element P4. This shifts the first portion such that its width remains the same or is increased back to its original width. On the other hand, a second portion of the red modulated-light component that first enters the second triangular-prism subelement P1b and then enters the fourth prism element P4 via the third prism element P3 is refracted when it becomes incident on the third prism element P3. This shifts the second portion such that its width is increased. The second portion is refracted again when it subsequently becomes incident on the fourth prism element P4. This shifts the second portion such that its width remains the same or is reduced back to its original width. Consequently, the beam width W1 of the red light component does not change.

On the other hand, the green modulated-light component travels along the same optical path as that shown in, for example, FIG. 8 in the fifth exemplary embodiment. In other words, the beam width W2 of the green light component is slightly reduced.

A first portion of the blue modulated-light component that first enters the first triangular-prism subelement P3a is refracted when it becomes incident on the fourth prism element P4. This shifts the first portion such that its width is reduced. On the other hand, a second portion of the blue modulated-light component that first enters the second triangular-prism subelement P3b is refracted when it enters the fourth prism element P4. This shifts the second portion such that its width is increased. Consequently, the beam width W3 of the blue light component is slightly increased.

Specific calculations for determining the amount of change in the beam width of the light component of each color will be omitted.

To summarize the above description, with respect to the horizontal cross-section CS perpendicular to the pair of dielectric multilayer films 27a, 27b, the use of the cross dichroic prism 727 shown in FIG. 11 allows the beam width W2 of the green light component to be relatively reduced and the beam width W3 of the blue light component to be relatively increased while maintaining the beam width W1 of the red light component constant. In other words, according to the eighth exemplary embodiment, the width of the green projection-image component can be made smaller than the width of the red projection-image component, and the width of the blue projection-image component can be made larger than the width of the red projection-image component. Accordingly, this is effective for correcting the chromatic aberration in a projecting lens that projects the green projection-image component larger than the red projection-image component, and the blue projection-image component smaller than the red projection-image component.

Although the refractive index of the first triangular-prism subelements P1a, P2a, P3a, P4a is higher than the refractive index of the other prism components in the above description, the refractive index of the first triangular-prism subelements P1a, P2a, P3a, P4a may alternatively be lower than the refractive index of the other prism components. In this case, with respect to the horizontal cross-section CS perpendicular to the pair of dielectric multilayer films 27a, 27b, the beam width W2 of the green light component can be relatively increased and the beam width W3 of the blue light component can be relatively reduced while maintaining the beam width W1 of the red light component constant. Accordingly, this may be effective for correcting the chromatic aberration in a projecting lens that projects the green projection-image component smaller than the red projection-image component, and the blue projection-image component larger than the red projection-image component.

Furthermore, instead of the first triangular-prism subelements P1a, P2a, P3a, P4a, the refractive index of the second triangular-prism subelements P1b, P2b, P3b, P4b may alternatively be set higher or lower than the refractive index of the other prism components. In this case, with respect to the horizontal cross-section CS perpendicular to the pair of dielectric multilayer films 27a, 27b, the beam width W2 of the green light component can be relatively increased or reduced and the beam width W3 of the blue light component can be relatively reduced or increased while maintaining the beam width W1 of the red light component constant. Accordingly, this may be effective for correcting the chromatic aberration in a projecting lens that projects the green projection-image component smaller or larger than the red projection-image component, and the blue projection-image component larger or smaller than the red projection-image component.

Although exemplary embodiments of the present invention have just been described above with reference to the exemplary embodiments, exemplary embodiments of the present invention are not limited to these exemplary embodiments. For example, although each of the cross dichroic prisms 27 to 727 in the above exemplary embodiments has a combination of the first prism element P1 for receiving the red modulated-light component, the second prism element P2 for receiving the green modulated-light component, and the third prism element P3 for receiving the blue modulated-light component, such a combination is changeable by adjusting the characteristics of the dielectric multilayer films 27a, 27b.

Furthermore, although each of the above exemplary embodiments is provided with the two fly's-eye optical units 21d, 21e to separate the light from the light-source device 21 into a plurality of light-beam components, exemplary embodiments of the present invention are applicable to projectors that do not use lens arrays such as these fly's-eye optical units. Moreover, the fly's-eye optical units 21d, 21e may be replaced with a rod integrator.

Furthermore, although each of the above exemplary embodiments is provided with the polarization-converting member 21g in the light-source device 21, exemplary embodiments of the present invention are applicable to a projector that does not use such a polarization-converting member 21g.

Furthermore, although the above exemplary embodiments described above are examples in which exemplary embodiments of the present invention apply to transmissive projectors, exemplary embodiments of the present invention also apply to reflective projectors. Here, the term "transmissive" denotes a type of a light valve including, for example, a liquid-crystal panel that transmits light, whereas the term "reflective" denotes a type of a light valve that reflects light. In a reflective projector, for example, the light valve may only require a liquid-crystal panel, and a pair of polarizing plates in this case is not necessary. The light-modulating elements are not limited to, for example, liquid-crystal panels, and may alternatively include, for example, micro-mirrors.

Furthermore, although there are two types of projectors, namely, a front projection type that projects an image towards a projection plane from a side of a viewer and a rear projection type that projects an image towards a projection plane from a side opposite to that of a viewer, the structure of the projector shown in, for example, FIG. 1 is applicable to either types.

The invention claimed is:

1. A projector, comprising:
   three light-modulating elements respectively illuminated with illumination-light components of three colors, each light-modulating element independently modulating the illumination-light component of the corresponding color;
   a light-synthesizing member including first to fourth triangular prism elements, each having a first, second, and third side surface, and a pair of dichroic mirrors disposed along the first and second side surfaces of the first to fourth prism elements, the modulated-light components of the three colors from the three light-modulating elements respectively entering the third side surfaces of the first to third prism elements, and the modulated-light components of the three colors being synthesized to form image light, the image light being emitted from the third side surface of the fourth prism element; and
   an optical projecting unit to project the image light synthesized via the light-synthesizing member,
   one or two of the first to fourth prism elements having a refractive index or refractive indexes different from a refractive index or refractive indexes of remaining prism elements, the remaining prism elements having a same refractive index.

2. The projector according to claim 1, the modulated-light component of a predetermined color entering the third side surface of the first prism element being transmitted through the pair of dichroic mirrors, the modulated-light components of the remaining colors entering the corresponding third side surfaces of the second and third prism elements being respectively reflected by the pair of dichroic mirrors such that corresponding optical paths of the modulated-light components of the remaining colors are bent, and the second to fourth prism elements having the same refractive index.

3. The projector according to claim 2, the predetermined color being a color corresponding to a chromatic aberration that remains in the optical projecting unit by a greatest degree.

4. The projector according to claim 2, the predetermined color corresponds to a red light component, and one of the first to third prism elements that receives the modulated-light component of a red color having a refractive index higher than a refractive index of the other prism elements that receive the modulated-light components of the remaining colors.

5. The projector according to claim 1, the first prism element being disposed between the second and third prism elements and being opposed to the fourth prism element, the second and third prism elements having the same refractive index, and a difference in refractive index between the first prism element and the second and third prism elements and a difference in refractive index between the fourth prism element and the second and third prism elements being substantially a same magnitude but opposite in sign to each other.

6. The projector according to claim 1, the first prism element being disposed between the second and third prism elements and being opposed to the fourth prism element, the first and second prism elements having a same refractive index and having a same difference in refractive index with respect to the third and fourth prism elements, and the third and fourth prism elements having a same refractive index.

7. The projector according to claim 1, the first prism element being disposed between the second and third prism elements and being opposed to the fourth prism element, the first and fourth prism elements having a same refractive index and having a same difference in refractive index with respect to the second and third prism elements, and the second and third prism elements having a same refractive index.

8. A projector, comprising:
   three light-modulating elements respectively illuminated with illumination-light components of three colors, each light-modulating element independently modulating the illumination-light component of the corresponding color;
   a light-synthesizing member including first to fourth triangular prism elements each having a first, second, and third side surface, and a pair of dichroic mirrors disposed along the first and second side surfaces of the first to fourth prism elements, the modulated-light components of the three colors from the three light-modulating elements respectively entering the third side surfaces of the first to third prism elements, and the modulated-light components of the three colors being synthesized to form image light, the image light being emitted from the third side surface of the fourth prism element; and
   an optical projecting unit to project the image light synthesized via the light-synthesizing member,
   at least one of the first to fourth prism elements including a first triangular-prism subelement and a second triangular-prism subelement having different refractive indexes.

9. The projector according to claim 8, one of the first to fourth prism elements including the first triangular-prism sub element and the second triangular-prism subelement having the different refractive indexes, and
   the refractive index of the second triangular-prism subelement in the one of the first to fourth prism elements being the same as that of the remaining prism elements.

10. The projector according to claim 8, two or three of the first to fourth prism elements each including the first triangular-prism subelement and the second triangular-prism subelement having the different refractive indexes,
    the first triangular-prism subelements in the two or three of the first to fourth prism elements having a same refractive index and being disposed at positions not adjacent to each other, and
    the refractive index of the second triangular-prism subelements in the two or three prism elements being a same as that of the remaining prism elements.

11. The projector according to claim 8, the first to fourth prism elements each including the first triangular-prism subelement and the second triangular-prism subelement having the different refractive indexes,
    the first triangular-prism subelements in the first to fourth prism elements having a same refractive index and being disposed at positions not adjacent to each other, and
    the second triangular-prism subelements in the first to fourth prism elements having a same refractive index and being disposed at positions not adjacent to each other.

* * * * *